Figure 1:
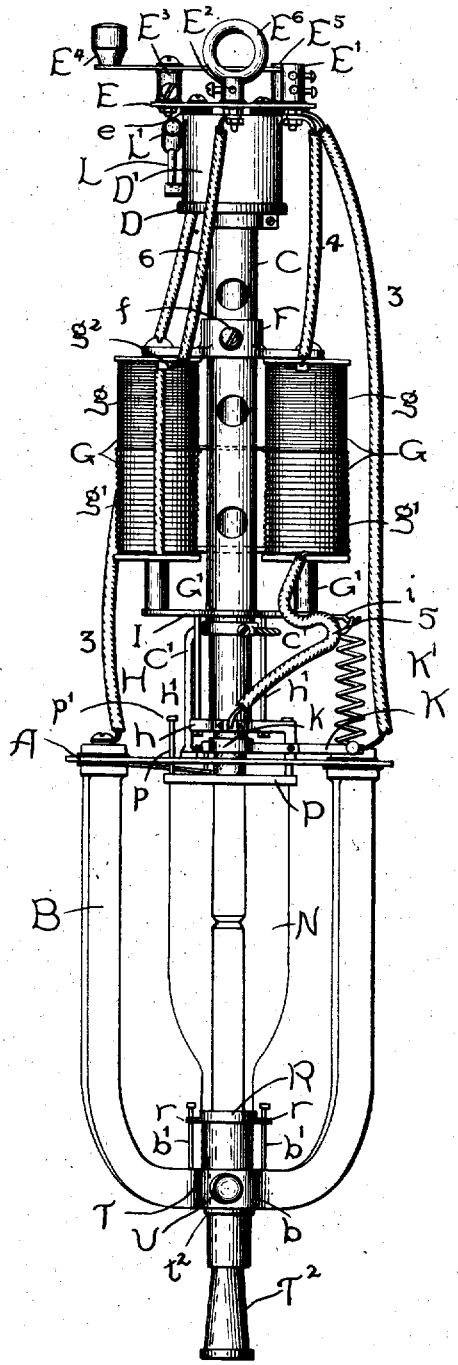

No. 11,930. Reissued Sept. 3, 1901.

D. HIGHAM.

ELECTRIC ARC LAMP.

(Application filed July 20, 1901.)

2 Sheets—Sheet 1.

Witnesses
Marcus L. Byng.
Benjamin B. Hull.

Inventor.
Daniel Higham,
by Albert G. Davis
Atty.

No. 11,930. Reissued Sept. 3, 1901.

D. HIGHAM.

ELECTRIC ARC LAMP.

(Application filed July 20, 1901.)

2 Sheets—Sheet 2.

Witnesses.
Marcus L. Byng.
Benjamin B. Hull.

Inventor.
Daniel Higham.
by Albert G. Davis
Atty.

UNITED STATES PATENT OFFICE.

DANIEL HIGHAM, OF WINTHROP HIGHLANDS, MASSACHUSETTS, ASSIGNOR TO THE GENERAL ELECTRIC COMPANY, OF NEW YORK.

ELECTRIC-ARC LAMP.

SPECIFICATION forming part of Reissued Letters Patent No. 11,930, dated September 3, 1901.

Original No. 675,599, dated June 4, 1901. Application for reissue filed July 20, 1901. Serial No. 69,152.

*To all whom it may concern:*

Be it known that I, DANIEL HIGHAM, a citizen of the United States, residing at Winthrop Highlands, county of Suffolk, State of Massachusetts, have invented certain new and useful Improvements in Electric-Arc Lamps, (Case No. 2,349,) of which the following is a specification.

My invention relates to electric-arc lamps for direct-current constant-potential circuits, and its main feature consists, generally speaking, in a regulating series magnet having one portion of the winding fine and of high resistance, the other portion coarse and of low resistance, and a coil of high self-induction, but low resistance, in parallel with the fine-wire portion of the magnet. The scope of my invention will be pointed out in the claims appended hereto. The result of this arrangement is that the current entering the lamp divides between the inductance-coil and the fine-wire winding, about ten per cent. of the current flowing normally through the fine-wire coil. Upon an increase of the voltage in the mains or of the current in the arc the self-induction of the inductance-coil resists the increase of current and compels it to flow through the fine-wire winding. This effect is only momentary, however, since the inductance-coil quickly adjusts itself to the new voltage. The rapidity of restoration of the normal ratio depends upon the ratio between the self-induction and resistance of the fine-wire windings as compared with the ratio between the greater self-induction and lower resistance of the inductance-coil. The effect of the sudden increase of current in the fine-wire windings is to strengthen their magnetism and lift the carbon, thereby lengthening the arc, and this takes place before the arc can be seriously affected by the change in the current intensity. A dash-pot prevents the carbon from too violent or excessive movements or from getting into a condition of rhythmic oscillation. The lengthened arc is maintained by the combined action of the fine and coarse wire winding of the magnet. Conversely, upon a decrease of current the magnetism of the fine winding is suddenly lessened and the carbon is dropped, shortening the arc before the decrease in current can affect it. The object of thus changing the length of the arc is to vary the potential of the arc in correspondence with the varying intensity of the line-current to prevent the arc from rupturing.

It will be seen that my improved lamp provides a circuit of low resistance through the lamp-magnet, with means for opposing momentarily any variation in the current intensity in said circuit, said means being shunted by a clutch-actuating device of normally low magnetism, but capable of responding instantly with greatly-increased magnetism to any fluctuation in current. One great practical advantage of a lamp thus constructed is that it automatically adjusts itself to any voltage, so that the same lamp can be connected up in circuits carrying, for example, anywhere from ninety to one hundred and twenty volts without requiring any adjustment or change of parts. Another advantage is that there is a greater percentage of watts at the arc, and therefore a great increase of light, a one-hundred-volt arc being about double the length of an eighty-volt arc. Further, the wide separation of the carbons largely prevents the shadow of the lower carbon from becoming objectionable.

The mechanical details of my improved lamp will now be described in connection with the accompanying drawings, in which—

Figure 2:
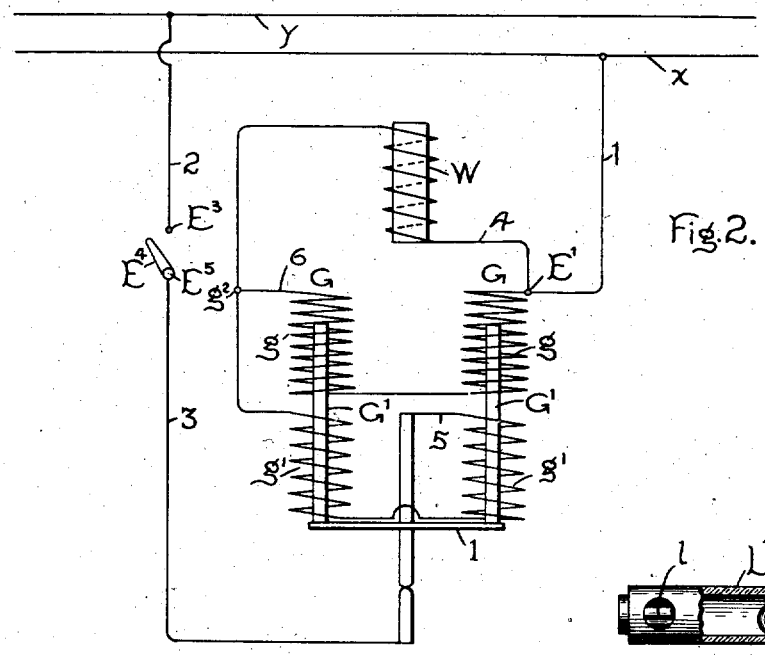
Figure 3:
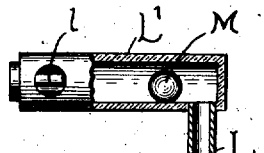
Figure 6:
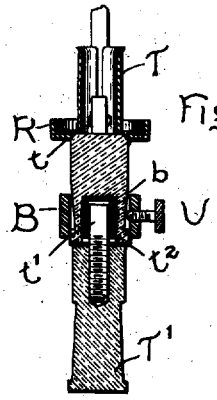
Figure 4:
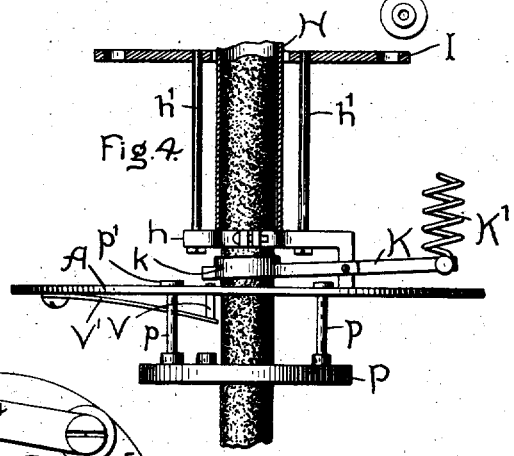
Figure 5:
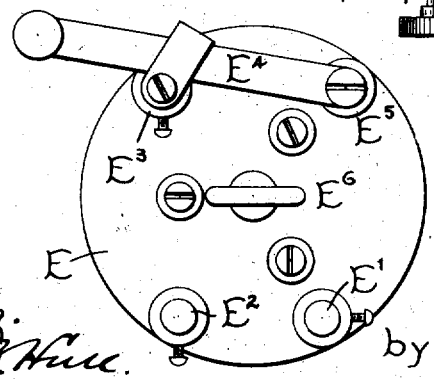

Figure 1 is an elevation of my improved lamp. Fig. 2 is a diagram of the circuits. Fig. 3 is a detail view, partly broken away, of the by-pass on the dash-pot. Fig. 4 is an enlarged view of the clutch and adjacent parts. Fig. 5 is a top plan view of the plate carrying the binding-posts and switch. Fig. 6 is a longitudinal section of the lower-carbon holder and the socket of the inner globe.

The frame of the lamp consists of a plate A, from which depends the hanger B to carry the lower-carbon support and inner globe. A tubular backbone rises centrally above the plate A, on which it is supported by two legs C′, one of which is broken away in Fig. 1. Fastened at the upper end of the backbone is a circular head D, which forms the bottom of a dash-pot D′, closed at the upper end. A plate E is secured on top of the dash-pot, with insulation $e$ between them, and to said plate are attached the binding-posts E′ $E^2$ $E^3$, the switch $E^4$, fulcrumed on the post $E^5$, and the suspension-eye $E^6$. A yoke F is fastened to the backbone C by a set-screw $f$, and suspended from its ends are the solenoids G, each having a portion wound with fine wire $g$ and another portion wound with coarse wire $g'$. The fine coils are connected in series to form practically one winding, and the coarse coils are also similarly connected, the two windings being also connected in series, so as to form one continuous winding.

The wire 1 from the positive main $x$ is connected with the binding-post E′, while the wire 2 from the negative main $y$ connects with the binding-post $E^3$. The hanger B, which is insulated from the plate A and carries the current from the lower carbon, is connected by wires 3 with the post $E^5$. The fine-wire terminal of the two-part solenoid G is connected by wire 4 with the positive binding-post E′, while the coarse-wire terminal of the solenoid is connected by a flexible wire 5 with the upper-carbon holder. The fine and coarse windings are joined at $g^2$, and from this point a wire 6 runs to the binding-post $E^2$. The terminals of the inductance-coil are connected with the binding-posts E′ $E^2$.

The upper-carbon holder consists of a tube H, having a sliding fit in the backbone C. Its lower end extends down between the legs C′ and carries a yoke $h$, which is rigidly connected by rods $h'$ with a cross-head I, loosely encircling the backbone C and carrying the cores G′ of the solenoids G. One end of the yoke $h$ is extended to afford a fulcrum for the clutch-lever K, having at one end a ring-clutch $k$ to engage with the upper carbon and provided at its other end with a helical spring K′, suspended from a hook $i$ on the cross-head I.

The upper end of the carbon-holder H projects into the dash-pot D′, where it is provided with the usual piston. On the outside of the dash-pot is a by-pass pipe L, connecting its upper and lower ends. The pipe has an enlargement or chamber L′, slightly inclined and containing a ball-valve M, whose play is limited by a pin $l$ entering the upper end of the chamber. When the piston rises, the ball obstructs the by-pass sufficiently to retard the flow of air and impede the movement of the piston; but the descent of the piston is not retarded, as the ball is forced up against the end of the pin $l$, leaving ample space for the air to pass by it.

The inner globe N is held between an upper cap P and a lower socket R. The cap is loosely suspended by small rods $p$, which pass up through the plate A and have heads $p'$ on their upper ends. The socket R is a countersunk ring concentric with the eye $b$ in the hanger B. Upright studs $b'$, passing through ears $r$ on the ring, guide the vertical movements of the socket. The lower-carbon holder T has a shoulder $t$, which when the holder is pushed up through the eye $b$ lifts the socket R. A set-screw U retains the holder T in place. The lower portion T′ of the holder is screwed upon an insulated screw $t'$, fixed in the part T, and insulating-washers $t^2$ are interposed between the two parts T T′. The part T′ also forms a support for the outer globe.

Above the cap P is a short pin V, passing through a hole in the plate A under the edge of the ring-clutch $k$. The pin is suitably supported, preferably by a flat spring V′, attached to the under side of the plate A.

When the globe N is not in place, the cap P hangs suspended by the headed rods $p$, as shown in Fig. 4, and the pin V is in its lowest position. The globe can be inserted by slightly raising the cap P. When the lower-carbon holder T is pushed up into place, it lifts the socket R with the globe and cap. The latter strikes and raises the pin V, which in turn lifts the ring-clutch and releases the upper carbon. When the lamp is recarboned, the unconsumed piece of the upper carbon can be released by pushing up the spring V′ and pin V by hand.

The inductance-coil W is preferably of the "hedgehog" variety, and its terminals are connected with the binding-posts E′ $E^2$. It is conveniently housed in a canopy at the upper end of the tubing, which conceals the wires and the long hook or other means for suspending the lamp.

The working parts are inclosed in the usual casing.

What I claim as new, and desire to secure by Letters Patent of the United States, is—

1. In an electric-arc lamp, the combination of a series coil, an auxiliary coil, and means for causing the magnetomotive force of said auxiliary coil to vary at a rate different from the rate of variation of current in the arc.

2. In an electric-arc lamp, the combination of a series coil, an auxiliary coil, and means for causing the magnetomotive force of said auxiliary coil to vary at a rate greater than the rate of variation of current in the arc.

3. In an electric-arc lamp, the combination of an arc-regulating mechanism acted upon by coils traversed by current flowing through the arc, one serving primarily to maintain a separation of the electrodes and another more sensitive to current variations in the arc and acting to promptly adjust the length of the arc in response to said current variations.

4. In an electric-arc lamp, the combination of a magnet-winding including two coils both of which are traversed by current flowing through the arc, and means for causing a variation of current in the arc to produce a quicker rate of change of current in one of the coils than in the other.

5. In an electric-arc lamp, the combination of a magnet-winding including two coils both of which are traversed by current flowing through the arc, and means for causing a variation of current in the arc to produce momentarily a greater proportional change of current in one of the coils than in the other.

6. In an electric-arc lamp, the combination of an arc-regulating mechanism controlled by coils carrying current flowing through the arc, and means for causing the rise or fall of current in one of the coils to vary at a rate different from the rate of change in another of said coils.

7. In an electric-arc lamp, the combination of a magnet-winding in portions arranged in series with each other, and a branch circuit shunted about one of said portions.

8. In an electric-arc lamp, the combination of a magnet-winding in portions arranged in series with each other, and a branch circuit of considerable self-induction shunted about one of said portions.

9. In an electric-arc lamp, the combination, with a series coil comprising two portions, of an inductance-coil in shunt to one of said portions.

10. In an electric-arc lamp, the combination with a series coil comprising two portions of differing resistance, of an inductance-coil in shunt to the portion of higher resistance.

11. In an electric-arc lamp, the combination with a series coil comprising two portions, one of fine wire and one of coarse wire, of an inductance-coil in shunt to the fine-wire portion of said coil.

12. In an electric-arc lamp, the combination with a series coil comprising two portions of differing resistance, of an inductance-coil of low resistance in shunt to the higher-resistance portion of the series coil.

13. In an electric-arc lamp, the combination, with a vertically-movable upper-carbon holder, of a dash-pot connected therewith having closed ends and provided with a by-pass containing a check-valve permitting a slow leakage when closed.

14. In an electric-arc lamp, the combination with a vertically-movable upper-carbon holder, of a dash-pot connected therewith, a by-pass for said dash-pot, containing a chamber, a ball-valve in said chamber, and means for limiting the movement of the valve.

15. In an electric-arc lamp, the combination with an inner globe, of a vertically-movable cap and socket to receive said globe, and a lower-carbon holder arranged to lift and firmly secure these parts when inserted into place.

16. In an electric-arc lamp, the combination with a frame comprising a plate and a hanger depending therefrom, of a cap, suspending-rods attached thereto and passing loosely through the plate, a socket vertically movable on the hanger, an inner globe adapted to be held between the cap and socket, and a lower-carbon holder arranged to lift the socket, globe and cap when inserted into place.

17. In an electric-arc lamp, the combination, with a vertically-movable cap for the inner globe, of a clutch for the upper carbon, and a tripping device for said clutch normally held in operative position by said cap.

18. In an electric-arc lamp, the combination, with a vertically-movable cap for the inner globe, of a ring-clutch for the upper carbon, and a pin arranged to be forced up against said ring when the cap is raised.

19. In an electric-arc lamp, the combination with a frame comprising a plate, of a cap for the inner globe loosely suspended below said plate, a ring-clutch for the upper carbon located above said plate, and a spring-supported pin passing up through the plate under the ring and adapted to be raised when the cap is lifted.

20. In an electric-arc lamp, means for tripping the clutch to release the upper carbon when the lower-carbon holder is inserted into place.

21. In an electric-arc lamp, a lower-carbon holder made in two parts, an insulated screw fixed in one part and engaging with the other, and insulating-washers between the two parts.

22. In an electric-arc lamp, the combination of a frame, a cap, and rods movably engaging said frame and secured to said cap.

23. In an electric-arc lamp, the combination of an arc-regulating mechanism controlled by a plurality of coils connected so as to carry current flowing through the arc, and means for causing a variation of current in the arc to produce momentarily a greater proportional change of current in one of the coils than in another.

In witness whereof I have hereunto set my hand this 15th day of July, 1901.

DANIEL HIGHAM.

Witnesses:

H. W. WILLIAMS,

E. B. SMALL.